United States Patent Office 3,519,576
Patented July 7, 1970

3,519,576
LATENT CURING EPOXY COMPOSITIONS CONTAINING A CRYSTALLINE POLYPHENATE SALT OF A POLYAMINE AND 2,4,4-TRIMETHYL-2,4,7-TRIHYDROXYFLAVAN
Calvin K. Johnson, White Bear Lake, Minn., assignor to Minnesota Mining and Manufacturing Company, St. Paul, Minn., a corporation of Delaware
No Drawing. Filed Nov. 23, 1966, Ser. No. 596,410
Int. Cl. C08j 30/14
U.S. Cl. 260—2        6 Claims

ABSTRACT OF THE DISCLOSURE

Single component latent curing epoxy resin compositions containing as a heat activatable curing agent a crystalline polyphenate salt of a polyamine and a polyhydric phenol, substantially insoluble in the resin at room temperature, preferred examples being a 1:1 salt of 2,4,4-trimethyl-2',4',7-trihydroxyflavan and N,N'-dimethyl-1,3-propanediamine, and the 2:1 salt of bisphenol A and triethylenetetramine.

---

This invention relates to latent curing epoxy resin compositions.

Mixtures of epoxy resins and conventional amine curing agents generally have a short pot life, i.e., remain free flowing and uncured for only a short time at room temperature. Aliphatic amine curatives, commonly used, gel the resins within about ½ to 3 hours at room temperature. Considerable efforts have been devoted to developing epoxy resin compositions containing latent curing agents which will have a long pot life at room temperature, thus improving the convenience of handling and storing the resin compositons, but which will cure rapidly upon heating. For example, boron trifluoride amine complexes have been used as latent curing agents. See, for example, U.S. Pat. 2,717,885 (Greenlee) issued Sept. 13, 1955. These complexes, however, provide slow cures and are corrosive, sensitive to moisture, and not truly latent due to a gradual release of the amine curative from the complex, or cure of the resin by the complex itself.

Carboxylic acid salts of amines have also been used as latent curatives, but the pot lives of the resin mixtures using the same are short due to esterification of the acid groups by reaction with the epoxy groups. Also, the cure rates provided by these curatives at elevated temperatures are slower than those obtained by using the corresponding free amines. Other latent curing agents have been used such as dicyandiamide and triethanolamineborates, but these require long high temperature curing cycles to give optimum properties.

The present invention provides epoxy resins containing new latent and semi-latent curing agents having shelf lives equal to or better than those of known latent curing resins which can be activated at lower temperatures and which, once activated, will cure to hard, tough solids more rapidly than latent compositions hitherto available. The normal curing agents used in this invention are crytalline polyamine salts of polyhydric phenols which are substantially insoluble in the resin compositions at room temperature. These curing agents rapidly melt and/or disoslve in the resin upon moderate heating. The curing agents in finely divided form resist settling in the resin composition so that the compositions can be cured in thick cross-sections to a substantially uniform hardness from top to bottom. The curing agents used in this invention often surprisingly provide more rapid cures than the corresponding unblocked amines. The rate of cure provided by these curatives is more rapid than with latent curing agents previously available. The curatives used in the resin systems of this invention substantially eliminate the problem of dermatitus caused by free amine curatives. Moreover, the curing agents used in this invention are non-hygroscopic, non-corrosive, and moisture sensitive, in sharp contrast with aliphatic polyamines and $BF_3$-amine complexes.

Monophenol salts amines have been used as non-latent curatives for epoxy resins. See, for example, British Pat. 959,028 issued May 27, 1964, which proposes the use of ammonium phenates as accelerators in anhydride cured epoxy resins. Such salts, however, are soluble in the epoxy resins and, although these curatives provide some improvement in pot life, they do not provide long term latency. The use of amine salts of tar acids as curatives for epoxy resins is described in South African Pat. 62/2,043. These phenolamine salts are low viscosity liquids which are soluble in the epoxy resins and cause them to gel in only a few hours at room temperature.

The curatives used in this invention are crystalline di- or polyamine salts of di- or polyhydric phenols insoluble in the epoxy resin. Phenol amine salts have also been referred to as phenol amine adducts, phenol amine complexes, and ammonium phenates in the literature. The presence of strong broad absorption bands in the 3.7 to 4.2$\mu$ region of the infrared spectra of these compounds indicates that they are ammonium phenate salts.

An important advantage of the curing agents used in the resins of this invention is that the phenols, which contain two or more phenolic hydroxyl groups per molecule, react with the epoxy groups during the cure and serve as crosslinking or chain extending agents. Thus the polyhydric (including dihydric) phenols, when liberated by heating of the resin composition, become an integral part of the cured resin, and thus contribute to the ultimate properties of the material rather than being distributed therein in the form of an inert filler which could detract from the properties of the resin if present in significant amounts. Any polyphenol which forms crystalline substantially resin-insoluble salts with polyamines may be used to prepare the type of latent, heat activatable curatives disclosed in this invention. Examples of such phenols are resorcinol, bisphenol A, 4,4'-dihydroxy1 biphenyl, 1,5-dihydroxynaphthalene, 2,4,4-trimethyl-2',4',7-trihydroxyflavan, 2,2,4-trimethyl-4--(2-dihydroxyphenyl) chroman, and p,p'-oxybisphenol. Other polyhydric phenols are given in the accompanying examples, and many other polyhydric phenols will be apparent to those skilled in the art.

The polyamines (including diamines) used to prepare these salts may contain any combination of primary, secondary, and tertiary aliphatic or aromatic amine groups. Preferred polyamines are those which when used separately as curatives for epoxy resins are highly reactive, providing rapid cures at room temperature. The salts of this invention permit the use of such highly reactive amines in latent one-component resin systems. Examples of these preferred amines are 1,3-propanediamine, ethylenediamine, 1,6-hexamethylenediamine, N,N-dimethyl-1,3-propanediamine, N,N-diethyl-1,3-propanediamine, diethylenetriamine, triethylenetetra-amine, and imino bispropylamine. Many other polyamines will be apparent to those skilled in the art.

A particularly useful curative is the 2:1 salt of bisphenol A and triethylenetetramine, a new composition of matter. Addition of stoichiometric amounts of this salt to liquid epoxy resins such as diglycidyl ethers of p,p'-isopropylidenediphenol (e.g. Epon 828, a liquid diglycidyl ether of bisphenol A with a molecular weight of 375 and an epoxy equivalent of 192) gives semi-latent systems having shelf lives of 3 to 4 weeks at room temperature and at least 6 months when refrigerated. On heating to 120° C. or higher, the crystals melt and/or dissolve in the resin which then cures rapidly. Generally the resins gel within 10–15 seconds after the crystals dissolve. Since the preferred curing agents allow so little time for diffusion, the salt must be very finely dispersed in the resin to obtain uniform cure.

Another preferred curative is the 1:1 salt of N,N-dimethyl-1,3-propanediamine and 2,4,4 - trimethyl-2',4',7-trihydroxyflavan, also a new composition of matter. When fine crystals are stirred into a liquid resin (e.g. Epon 828) stable systems are obtained which undergo no significant premature cure of the resin or settling of the curing agent after 8 months storage at room temperature. Rapid cure of the resin is obtained when these latent systems are heated to 80° to 120° C. using as little as 20 parts curative per hundred parts by weight resin in "Epon 828," and even faster cures are obtained using 30 parts per hundred parts by weight of this salt.

The shelf lives of the latent curing epoxy resin systems are mainly dependent on the stability of the salt curative, the crystal size, and the solubility of the curative in the epoxy resins employed. Solubility of the salt in the resins is difficult to measure, but an indication of this solubility can be obtained by measuring the solubility of the salts in phenyl glycidyl ether, which is chemically similar to most epoxy resins. It has been found that salts which are useful in accordance with the present invention have a room temperature solubility in phenyl glycidyl ether of less than about 0.6 gm. per 100 ml. The pot lives of some epoxy resin systems containing the 1:1 salt of N,N'-dimethyl-1,3-propanediamine and 2,4,4-trimethyl-2',4',7-trihydroxyflavan are unexpectedly significantly longer than those obtained with other salt curatives. While not wishing to be bound by any particular theory, it appears that the resin forms a gel on the surface of the individual crystals of this particular curative, thus encapsulating the crystals and preventing further reaction. Samples stored for long periods cure as well as freshly prepared samples.

The crystalline phenol salt curatives may be prepared in a number of ways. The preferred method consists of dissolving a polyphenol in a suitable hot solvent and adding either a stoichiometric amount or excess of a polyamine. The crystals that form on cooling are collected by filtration, washed and dried. Alternately, a mixture of a polyamine and a polyphenol may be heated in a solvent and the crystals that form on cooling are collected, washed and dried. In some cases, the polyphenols and polyamines may be heated together in the absence of a solvent and crystalline product obtained.

Many other polyamine polyphenol salts in addition to those given above are useful latent, heat activatable curing agents for epoxy resins, further examples being given in the accompanying examples, together with properties of the resin systems. It will be obvious to those skilled in the art that this list is only representative of the many phenol amine salt curatives which may be used and that many other similar salts could be cited.

The polyepoxides which may be made latent curing with the amine phenol salt compositions of this invention are those organic compounds and resins, containing an average of more than one and generally more than an average of about 1.5 oxirane groups per molecule, which can be hardened with amines or polyhydric phenols. Examples of such epoxy resins include, among others, polyglycidyl ethers obtained from the reaction of dihydric or polyhydric alcohols with epichlorohydrin, for example, resins made by condensing epichlorohydrin and glycerin to give di- and tri-epoxides having a functionality of about 2.2 (e.g., Epon 812) and polyglycol polyepoxides such as the diglycidyl ether of polypropylene oxide (available commercially under the trade designation of "D.E.R. 736"). Other examples include epoxidized polybutadiene and epoxidized butadiene-styrene copolymers.

Particularly useful resins are liquid polyglycidyl ethers of polyhydric phenols such as bisphenol A which usually have slightly less than two oxirane groups per average molecular weight (for example Epon 828, or ERL-2774). An example of a resin having more than two oxirane groups per average molecular weight are polyglycidyl ethers of phenol formaldehyde Novolaks (for example those available commercially under the trade designation "D.E.N. 438"). Still further examples of suitable resins are higher molecular weight solid epoxy resins made by condensing bisphenol A and epichlorohydrin (e.g., Epon 1001).

Fillers, diluents, plasticizers, and modifiers may be incorporated in the compositions of this invention. There is no deleterious effect on the shelf life of these systems as long as the additives are not solvents for the polyammonium phenate curatives.

The latent curing systems of this invention are useful in adhesives, laminating resins, potting compounds, and in other applications. The resins using the preferred curatives can be shipped and stored, at room temperature, and applied to a substrate as a single component adhesive. Cure is then triggered when desired by applying moderate heat, generally above about 80° C. to the resin, and preferably about 120° C. to 150° C. Other salts of invention may be used to provide increased pot life for in plant processing or may be shipped and stored at reduced temperatures.

The following examples, in which all parts are given by weight unless otherwise indicated, will serve to further illustrate but not limit the invention.

EXAMPLE I

This example demonstrates the preparation of a crystalline polyammonium phenate curative, the 2:1 salt of bisphenol A and triethylene tetramine. Bisphenol A, 456 parts, was dissolved in the minimum amount of refluxing methanol and 146 parts of triethylene tetramine added. The mixture was cooled at room temperature and filtered. The solid was washed with ether and dried to give 500 parts (83%) of salt, M.P. 138–142° C.

Calculated molecular composition for $C_{36}H_{50}N_4O_4$ (percent): C, 71.7; H, 8.3; N, 9.3. Analysis (percent): C, 71.6; H, 8.2; N, 9.1.

The results of the use of this salt as a curative are given in Tables I–III.

To demonstrate that these salts may be used to cure thick castings, 30 parts of the 1:2 triethylenetetramine salt of bisphenol A was milled into 98 parts of Epon 828 and 20 parts of the glycidyl ether of cashew nutshell oil, flexibilizer, on a roller mill. The mixture was degassed and cast into ¼ inch and ¾ inch thick blocks, and cured at 140° C. for 20 minutes to give clear well-cured blocks of resin. The top and bottom hardness of each of the cured blocks were determined to see if there was any significant differences. The results, which are shown below, indicate that no appreciable settling of the salt occurs during the curing and that these curatives can be used to prepare thick castings:

¼ inch sample, Rockwell M hardness:
  Top _____ 99
  Bottom _____ 102
¾ inch sample, Rockewll M hardness:
  Top _____ 96
  Bottom _____ 92

EXAMPLE II

The 1:1 salt of N,N-dimethyl-1,3-propanediamine and 2,4,4-trimethyl-2',4',7-trihydroxyflavan was prepared by dissolving 300 parts of the flavan in the minimum amount of refluxing n-propanol required to provide a clear solution and 150 parts of N,N-dimethyl-1,3-propane-diamine added. The solution was cooled in an ice bath and filtered. The crystalline product was washed with ether and vacuum dried to give 310 parts (77.5%) of the salt, M.P. 178–182° C. The other salts listed in Table III were similarly prepared using various solvents such as acetone, ethanol, toluene, etc.:

Calculated composition for $C_{23}H_{34}N_2O_4$ (percent): C, 68.7; H, 8.5; N, 7.0. Analysis (percent): C, 68.7; H, 8.5; N, 6.9.

The results of the use of this salt as a curative are given in Tables I–III.

EXAMPLE III

The salts of Examples I and II and other similarly prepared salts were incorporated into resins either by mixing fine crystals of the salts into the resins or by milling the salts into the resins. Care must be taken to avoid heating the mixtures during the milling or mixing operations in order to avoid premature cure. For example, 60 parts of the 2:1 salt of bisphenol A and triethylene tetramine was milled into 195 parts of Epon 828 by giving the mixture two passes on a roller mill. This resin composition had a shelf life of about 4 weeks at room temperature but gelled in 1.7 minutes at 120° C. and gave clear well cured samples after 10 minutes. Samples kept at 40° F. are stable for at least six months. The results obtained by incorporating other curatives in Epon 828 are given in Tables I–III, wherein a comparison with known curatives is also given. Other salts were prepared in a similar manner and used as latent curing agents, results being given in Table III.

TABLE I.—COMPARISON OF GEL TIMES OF LATENT CURATIVES AND CONVENTIONAL CURATIVES IN EPON 828

| Curative | Parts curative per 100 parts resin | Curing temperature, °C. | Gel time, minutes | Shelf life, 25° C. |
|---|---|---|---|---|
| 2:1 bisphenol A salt of triethylene tetramine | 30 | 120 | 1.7 | 3–4 weeks. |
| Triethylenetetramine | 10 | 120 | 3.0 | 1–2 hours. |
| 1:1 N,N-dimethyl-1,3-propanediamine salt of 2,4,4-trimethyl-2′,4′,7-trihydroxyflavan. | 20 | 120 | 2.0 | 8 months or more. |
| 1:1 N,N-dimethyl-1,3-propanediamine salt of 2,4,4-trimethyl-2′,4′,7-trihydroxyflavan. | 30 | 120 | 1.2 | 6–8 months. |
| N,N-dimethyl-1,3-propanediamine. | 10 | 120 | 2.5 | 1–2 hours. |
| Dicyandiamide | 6 | 145 | 15.0 | 6 months. |
| Tri-2-ethylhexoate salt of 2,4,6-tris-(dimethylaminomethyl) phenol (commercially available as Shell curative "D"). | 10 | 120 | 10.0 | 12 days. |
| Boron trifluoride monoethylamine complex. | 5 | 120 | 16.0 | 2–3 months. |

TABLE II.—ALUMINUM TO ALUMINUM OVERLAP SHEAR BOND STRENGTHS AT 25° C USING "ERL-2774" EPOXY RESIN [1] (U.S. MILITARY TEST MIL-A-5090D)

| Curative | Parts curative per 100 parts resin | Cure Cycle | Bond Strength |
|---|---|---|---|
| 2:1 salt of bisphenol A and triethylenetetramine. | 30 | 20 min. 250° F., 122° C | 1,720 p.s.i. (121 kg./cm.²). |
| 1:1 salt of N,N-dimethyl-1,3-propanediamine and 2,4,4-trimethyl-2′, 4′, 7-trihydroxyflavan. | 20 | 20 min. 250° F., 122° C | 3,180 p.s.i. (224 kg./cm.²). |
| Do | 30 | 10 min. 250° F., 122° C | 3,000 p.s.i. (211 kg./cm.²). |
| Do | 20 | 60 min. 180° F., 83° C | 2,500 p.s.i. (176 kg./cm.²). |

[1] A glycidyl ether of bisphenol A having an epoxy equivalent weight of 180–195.

TABLE III.—POLYAMINE-POLYPHENOL SALT CURATIVES IN EPON 828

| Salt Curative | | | | | | | |
|---|---|---|---|---|---|---|---|
| Amine | Phenol | Ratio, amine: phenol | percent N | M.P., °C. | Phr.[1] | Gel time, min. | Temp., °C. | Shelf life, 25° C. |
| Ethylenediamine | Bisphenol A | 1:1 | 8.8 | 99–108 | 25 | 2.0 | 120 | 1 day. |
| Diethylenetriamine | 2,4,4-trimethyl-2′,4′,7-trihydroxyflavan. | 1:1 | 9.8 | 117–23 | 33 | 3.0 | 130 | 1–2 weeks. |
| 1,6-hexanediamine | do | 1:1 | 6.6 | 150–3 | 30 | 2.0 | 150 | 2 weeks. |
| N,N-diethylethylenediamine | do | 1:1 | 6.9 | 159–62 | 40 | 2.5 | 140 | 1 week. |
| 1,3-propanediamine | do | 1:1 | 7.4 | 173–7 | 26 | 2.0 | 120 | Do. |
| N,N′-diethylethylenediamine | do | 1:1 | 6.7 | 142–7 | 30 | 15.0 | 120 | 2 weeks. |
| m-Phenylenediamine | Resorcinol | 1:1 | | 81–85 | 18.5 | 15.0 | 120 | 3 hours. |
| Ethylenediamine | 1,5-dihydroxynaphthalene | 2:3 | 9.8 | 150–4 | 18 | 10.0 | 135 | 1 week. |
| Diethylenetriamine | do | 2:3 | 13.4 | 120–3 | 18 | 10.0 | 135 | Do. |
| Do | 2,2,4-trimethyl-4-(2,4-dihydroxyphenyl) chroman. | 1:1 | 10.9 | 85–90 | 40 | 4.0 | 135 | 2 weeks. |
| Ethylenediamine | do | 1:1 | 8.4 | 137–40 | 40 | 5.0 | 120 | 1–2 days. |
| N,N-dimethyl-1,3-propanediamine | do | 1:1 | 7.2 | 113–15 | 50 | 5.0 | 100 | 2 days. |
| 1,6-hexanediamine | o,o′-biphenol | 1:1 | 9.3 | 126–127 | 25 | 1 | 120 | 6 days. |
| Ethylenediamine | p,p′-biphenol | 1:1 | 11.2 | 196–202 | 20 | 1.5 | 120 | 3 weeks. |
| 1,6-hexanediamine | do | 1:1 | 7.9 | 168–170 | 25 | 1.5 | 120 | Do. |
| Ethylenediamine | 4,4′-sulfonyldiphenol | 1:2 | 4.9 | 218–221 | 25 | 19 | 120 | 12 weeks. |
| Triethylenetetramine | Tetrachlorobisphenol A | 1:1 | 10.5 | 210–215 | 60 | 12 | 120 | Do. |

[1] Parts curative per 100 parts resin.

EXAMPLE IV

Five parts of the 1:1 salt of N,N-dimethyl-1, 3-propanediamine and 2,4,4-trimethyl-2', 4',7-trihydroxyflavan, 0–105μ crystals, was blended with 49 parts of the powdered solid epoxy resin, Epon 1001 (a condensation product of bisphenol A and epichlorohydrin having an average molecular weight of 875 and an epoxy equivalent weight of about 450 to 525), to give a free flowing powder having indefinite shelf life at 25° C. Heating of this mixture at 120° C. for 10 minutes gave a clear tough hard cured epoxy resin.

EXAMPLE V

Fifty-four parts of a polyglycidyl ether of phenol formaldehyde Novolak (D.E.N. 438) was warmed to approximately 45° C. and 14 parts of the powdered 1:1 salt of N,N-dimethyl-1,3-propanediamine and 2,4,4-trimethyl-2', 4',7-trihydroxyflavan was stirred in and the mixture allowed to cool to room temperature. When this resin mixture was heated to 120° C. for 10 minutes, a hard well-cured resin was obtained. This mixture had a shelf life of 1–2 weeks at room temperature.

EXAMPLE VI

Sixty parts of an epichlorohydrin-glycerine condensate molecular weight 306, epoxy equivalent 150 (Epon 812) was mixed with 16 parts of the powdered 1:1 salt of N,N-dimethyl-1, 3-propanediamine and 2,4,4-trimethyl-2', 4'-trihydroxyflavan to give a semilatent epoxy resin system which had a shelf life of 1–2 weeks at room temperature. On heating to 120° C. for 10 minutes, a tough flexible cured resin was obtained.

What is claimed is:

1. A latent curing epoxy resin composition which can be shipped and stored for weeks or months at room temperature and which will cure to a tough infusible solid at temperatures about 80° C., comprising an epoxy resin having an average of more than about 1.5 oxirane groups per average molecular weight containing distributed throughout said resin as a latent, heat activatable curing agent for said resin a crystalline polyphenate salt of a polyamine and 2,4,4-trimethyl-2', 4', 7-trihydroflavan, said salt being substantially insoluble in said resin and having a room temperature solubility in phenyl glycidyl ether of less than about 0.6 gm. per 100 ml., said salt being liquefiable at temperatures above about 80° C. to cure said resin on heating.

2. A composition according to claim 1 wherein said resin comprises a liquid epoxy resin.

3. A composition according to claim 1 wherein said resin comprises a solid epoxy resin.

4. A composition according to claim 1 wherein said polyamine is an aliphatic polyamine.

5. A composition according to claim 1 wherein said polyamine is N,N'-dimethyl-1,3-propanediamine.

6. A latent curing epoxy resin composition which can be held at room temperature for an increased time and which will cure to a tough infusible solid at moderately elevated temperatures, comprising an epoxy resin having an average of more than one oxirane group per average molecular weight containing distributed throughout said resin as a latent, heat activatable curing agent for said resin a crystalline polyphenate salt of N,N'-dimethyl-1,3-propanediamine and 2,4,4-trimethyl-2',4',7-trihydroxyflavan, said salt being substantially insoluble in said resin at room temperature and liquefiable at moderately elevated temperatures to cure said resin on heating.

References Cited

UNITED STATES PATENTS 2,906,723   9/1959   Reese.

WILLIAM H. SHORT, Primary Examiner

T. E. PERTILLA, Assistant Examiner

U.S. Cl. X.R.

117—161; 161—184; 260—47, 59, 88.3